US012711072B2

(12) United States Patent
Guo et al.

(10) Patent No.: US 12,711,072 B2

(45) Date of Patent: Aug. 18, 2026

(54) METHOD FOR MANAGING CACHE DATA, MEDIUM, AND ELECTRONIC DEVICE

(71) Applicant: Beijing Volcano Engine Technology Co., Ltd., Beijing (CN)

(72) Inventors: Kuankuan Guo, Beijing (CN); Yuanjin Lin, Beijing (CN); Liming Fang, Beijing (CN); Ming Zhao, Beijing (CN); Hao Wang, Los Angeles, CA (US); Dong Pan, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/784,193

(22) Filed: Jul. 25, 2024

(65) Prior Publication Data

US 2025/0068566 A1 Feb. 27, 2025

(30) Foreign Application Priority Data

Aug. 22, 2023 (CN) ......................... 202311062578.5

(51) Int. Cl.
*G06F 12/08* (2016.01)
*G06F 12/0831* (2016.01)
*G06F 12/0891* (2016.01)

(52) U.S. Cl.
CPC ...... *G06F 12/0891* (2013.01); *G06F 12/0833* (2013.01)

(58) Field of Classification Search
CPC ............. G06F 12/0891; G06F 12/0833; G06F 2212/1016; G06F 2212/1024;
(Continued)

(56) References Cited

U.S. PATENT DOCUMENTS

2011/0022778 A1 1/2011 Schibilla et al.
2018/0293165 A1* 10/2018 Zik ...................... G06F 16/273
(Continued)

FOREIGN PATENT DOCUMENTS

CN 110427158 A 11/2019
CN 112835534 A 5/2021
CN 114238162 A 3/2022

OTHER PUBLICATIONS

First Office Action mailed Apr. 30, 2026 in Chinese Application No. 202311062578.5, with English translation (13 pages).
(Continued)

*Primary Examiner* — Masud K Khan

(57) ABSTRACT

The present disclosure relates to a method for managing cache data, an apparatus, a storage medium and an electronic device, the method includes: acquiring a remaining available space of a solid-state disk for storing cache data; upon the remaining available space being less than a first space threshold, determining a first target fragment group in the solid-state disk that has the greatest garbage proportion, each fragment group including a first number of fragments, and each fragment corresponding to a second number of contiguous logical address spaces in the solid-state disk; and purging the cache data in the first target fragment of the first target fragment group that has the greatest garbage proportion, with this method, the space utilization rate of the solid-state disk can be improved.

20 Claims, 2 Drawing Sheets acquiring a remaining available space of a solid-state disk for storing cache data — S210 upon the remaining available space being less than a first space threshold, determining a first target fragment group in the solid-state disk that has the greatest garbage proportion, in which each fragment group comprises a first number of fragments, and each fragment corresponds to a second number of contiguous logical block address in the solid-state disk — S220 purging the cache data in the first target fragment of the first target fragment group that has the greatest garbage proportion — S230

(58) Field of Classification Search
CPC ..... G06F 2212/1044; G06F 2212/7203; G06F 2212/7205; G06F 12/0871; G06F 12/0246; G06F 3/0608; G06F 3/0638; G06F 3/0652; G06F 3/0685; Y02D 10/00
See application file for complete search history.

(56) References Cited

U.S. PATENT DOCUMENTS

| | | | | |
|---|---|---|---|---|
| 2018/0357160 | A1* | 12/2018 | Gorobets | G06F 3/064 |
| 2020/0393974 | A1* | 12/2020 | Bahirat | G06F 3/0685 |
| 2021/0064523 | A1* | 3/2021 | Kale | G06F 12/0246 |
| 2021/0263668 | A1* | 8/2021 | Urata | G06F 3/0689 |
| 2023/0048813 | A1 | 2/2023 | Chen | |

OTHER PUBLICATIONS

Shen et al., "Optimizing Flash-based Key-value Cache Systems," Jun. 21, 2016 (5 pages).

* cited by examiner

METHOD FOR MANAGING CACHE DATA, MEDIUM, AND ELECTRONIC DEVICE

CROSS-REFERENCE TO RELATED APPLICATION

The present application claims priority of the Chinese Patent Application No. 2023110625785, filed on Aug. 22, 2023, and the disclosure of the above-mentioned Chinese patent application is hereby incorporated in its entirety as a part of the present application.

TECHNICAL FIELD

The present disclosure relates to a method for managing cache data, an apparatus, a medium and an electronic device.

BACKGROUND

Cache data is a special kind of data, which is usually managed by designing a cache system. In order to achieve high-performance reading and writing of the cache data, a solid-state disk may be used as a storage medium of the cache system for storage.

However, in the related art, because of the serious writing amplification of the cache system, the space for storing the cache data in the solid-state disk is small, which reduces the space utilization rate of the solid-state disk.

SUMMARY

This Summary is provided to introduce concepts in a brief form that are described in detail below in the detailed description. This Summary is not intended to identify key features or essential features of the claimed technical solution, nor is it intended to be used to limit the scope of the claimed technical solution.

The present disclosure provides a method for managing cache data, the method includes:

- acquiring a remaining available space of a solid-state disk for storing cache data;
- upon the remaining available space being less than a first space threshold, determining a first target fragment group in the solid-state disk that has the greatest garbage proportion, in which each fragment group comprises a first number of fragments, and each fragment corresponds to a second number of contiguous logical address spaces in the solid-state disk; and
- purging the cache data in the first target fragment of the first target fragment group that has the greatest garbage proportion.

The present disclosure provides an apparatus for managing cache data, the apparatus includes:

- an acquisition module, configured to acquire a remaining available space of a solid-state disk for storing cache data;
- a first determining module, configured to, upon the remaining available space being less than a first space threshold, determining a first target fragment group in the solid-state disk that has the greatest garbage proportion, in which each fragment group includes a first number of fragments, each fragment corresponds to a second number of contiguous logical address spaces in the solid-state disk; and
- a first purging module, configured to purge the cache data in the first target fragment of the first target fragment group that has the greatest garbage proportion.

The present disclosure provides a computer-readable medium, a computer program is stored on the computer-readable storage medium, and the computer program, upon being executed by a processing device, implements the method above mentioned.

The present disclosure provides an electronic device, which includes:

- a memory, storing a computer program;
- a processor, configured to execute the computer program in the memory to implement the method above mentioned.

Other features and advantages of the present disclosure will be described in detail in the detailed description that follows.

BRIEF DESCRIPTION OF DRAWINGS

The above and other features, advantages, and aspects of the present disclosure will become more apparent by reference to the following detailed description upon being taken in conjunction with the accompanying drawings. Throughout the drawings, the same or similar reference numerals refer to the same or similar elements. It should be understood that the drawings are schematic and that components and elements are not necessarily drawn to scale. In the accompanying drawings.

DETAILED DESCRIPTION

Figure 1:
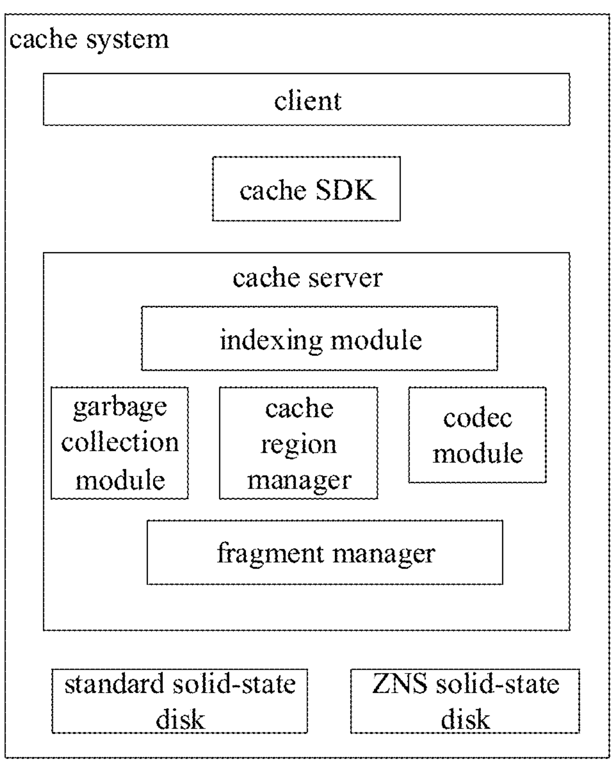
FIG. 1 is an architectural diagram of a cache system according to an exemplary embodiment of the present disclosure.

Embodiments of the present disclosure will be described in more detail below with reference to the accompanying drawings. While some embodiments of the present disclosure are illustrated in the accompanying drawings, it should be understood that the present disclosure may be embodied in various forms and should not be construed as limited to the embodiments set forth herein, but rather, these embodiments are provided for a more thorough and complete understanding of the present disclosure. It should be understood that the drawings and examples of the present disclosure are for exemplary purposes only and are not intended to limit the scope of the present disclosure.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that the modifications of "one" and "more" mentioned in the present disclosure are schematic rather than restrictive, and those skilled in the art should understand that unless otherwise explicitly stated in the context, it should be understood as "one or more".

Names of messages or information exchanged among multiple apparatuses in the embodiments of the present disclosure are only configured for illustrative purposes, and are not configured to limit the scope of these messages or information.

It will be appreciated that the data to which the present solution relates (including but not limited to the data itself, the acquisition or use of the data), should comply with the requirements of the corresponding laws and regulations and related regulations.

In the related art, the write amplification of the entire cache system is too serious, and the upper limit of the capacity of the solid-state disk for storing cache data in the cache system is difficult to determine because the space amplification cannot be accurately calculated, therefore, in the related art, it is generally impossible to use the entire solid-state disk for storage, thereby reducing the space utilization rate of the solid-state disk.

Exemplarily, the database Solid-state Disk (SSD) side common in the related art is mainly managed by Log-Structured Merge Tree (LSM TREE) based on RocksDB, the write amplification of this storage system is usually 10-30 times, at which RocksDB typically sets the effective cache capacity upper limit within a 70% water level, which reduces the space utilization rate of the Solid-state Disk.

RocksDB is an embeddable and persistent key-value storage system.

In view of the above existing technical problems, referring to FIG. 1, the embodiments of the present disclosure propose a new cache system, and propose a method for managing cache data implemented based on the cache system. As illustrated in FIG. 1, the cache system includes a client, a cache SDK (Software Development Kit), a cache server, an indexing module, a garbage collection (GC) module, a cache region manager, a codec module, a fragment manager, and a solid-state disk.

The cache SDK, is configured to provide a client interface for a user application to invoke the storage system.

The cache server, is configured to provide a caching process on a server.

The indexing module, is configured to index data on a memory and the solid-state disk.

The garbage collection module, is configured to collect unnecessary garbage data or discard a part of valid cache data.

The cache region manager, is configured to store migrated cache data in a partitioned manner according to hotness of the cache data.

The codec module, is configured to encode written data.

The solid-state disk, includes a ZNS solid-state disk that supports the ZNS (Zoned Namespace) protocol as well as a standard solid-state disk (i.e., a solid-state disk that does not support the ZNS protocol in the embodiments of the present disclosure).

The fragment manager, is configured to uniformly abstract the standard solid-state disk and the ZNS solid-state disk into fragments and fragment groups.

It should be noted that the above-described cache system illustrated in FIG. 1 is merely an example, and in some implementation, the cache system may include more or fewer structural units than that in FIG. 1.

Figure 2:
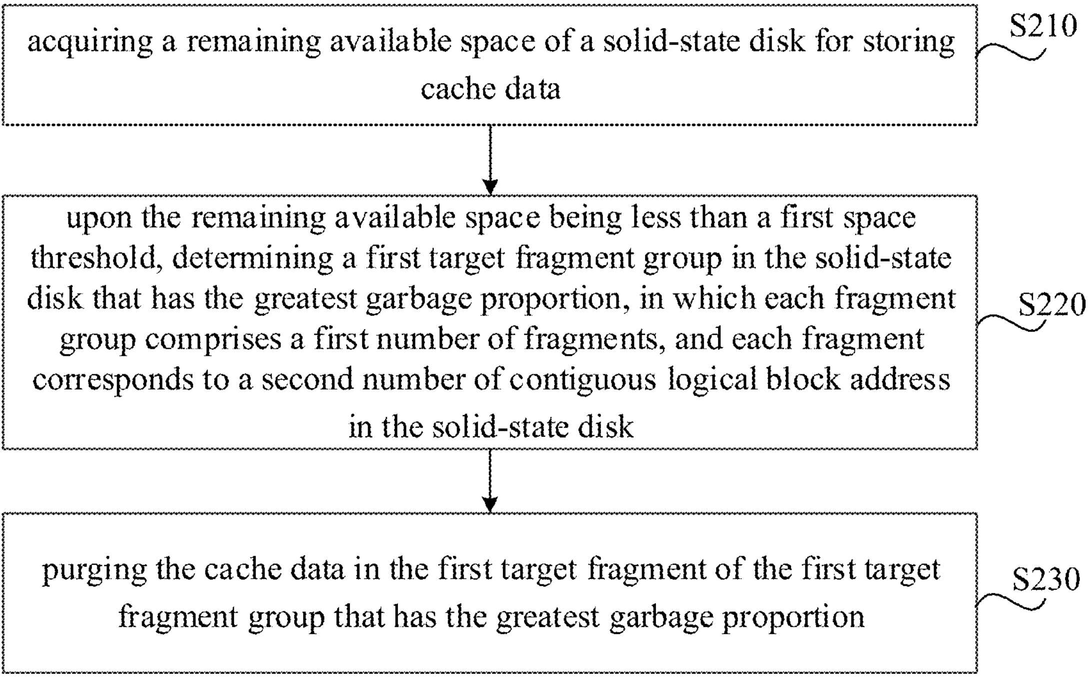
FIG. 2 is a flowchart of a method for managing cache data according to an exemplary embodiment of the present disclosure.

FIG. 2 is a flowchart of a method for managing cache data according to an exemplary embodiment of the present disclosure. The method for managing cache data may be applied to an electronic device, which includes the cache system illustrated in FIG. 1 described above, so that the electronic device can implement the method for managing cache data based on the cache system, and with reference to FIG. 2, the method for managing cache data includes the following steps.

S210, acquiring a remaining available space of a solid-state disk for storing cache data.

In the cache system of the embodiments of the present disclosure, the electronic device may use a solid-state disk to store cache data.

In some implementations, the remaining available space may be understood as a remaining space for storing the cache data, excluding a space for storing migrated data during garbage collection.

It can be understood that the cache data is not guaranteed to be necessarily readable upon subsequent reading, that is to say, the cache data is naturally characterized by missing data.

The electronic device acquiring the remaining available space of the solid-state disk may refer to the related art, which is not repeated here.

S220, upon the remaining available space being less than a first space threshold, determining a first target fragment group in the solid-state disk that has the greatest garbage proportion, in which each fragment group includes a first number of fragments, and each fragment corresponds to a second number of contiguous logical address spaces in the solid-state disk.

In the embodiments of the present disclosure, the first space threshold can be set, and a corresponding garbage collection policy may be selected according to a comparison result by comparing the remaining available space with the first space threshold.

Optionally, upon the remaining available space being less than the first space threshold, an aggressive garbage collection policy may be employed, that is, a garbage collection policy that proactively discarding a part of valid cache data.

Optionally, upon the remaining available space being greater than or equal to the first space threshold, a relatively conservative garbage collection policy may be employed, that is, not actively discarding data, but rather employing a garbage collection policy that migrates the valid cache data.

Optionally, the first space threshold may be expressed as a percentage, for example, 90%. Optionally, the first space threshold may be expressed as a storage space size, for example, 900 GB.

Figure 3:
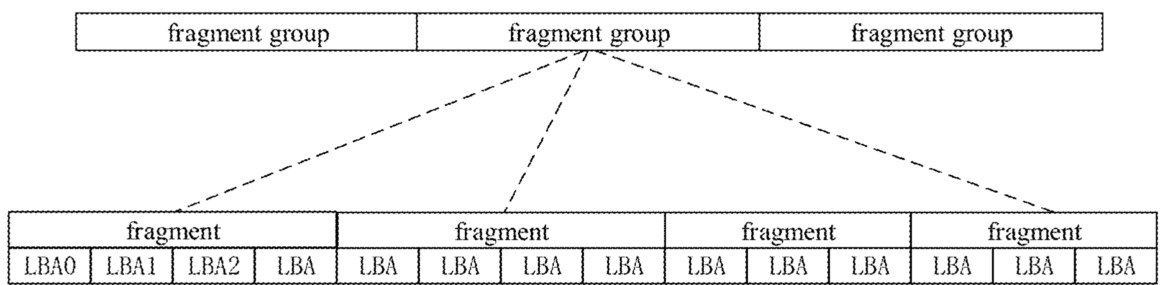
FIG. 3 is a schematic diagram of a logical address space abstraction structure according to an exemplary embodiment of the present disclosure.

In the embodiments of the present disclosure, the electronic device may abstract a logical address space (Logical Block Address, LBA) of the solid-state disk, and with reference to FIG. 3, the electronic device abstracts a second number of consecutive logical address spaces into a fragment and abstracts a first number of fragments into a fragment group. Each fragment in a fragment group may not be contiguous, and a plurality of different fragments may be written simultaneously within a fragment group.

Exemplary, for a 1 TB standard solid-state disk, every 1 GB of contiguous logical address spaces can be abstracted into a fragment. For a ZNS solid-state disk, a physical partition zone can be abstracted into a fragment.

Through the abstraction method of the fragment and fragment group, the method for managing cache data of the embodiments of the present disclosure can be compatible with various different solid-state disks, for example, the standard solid-state disk, the ZNS solid-state disk, a multi-data stream solid-state disk as well as a remote solid-state disk, etc. can be supported.

In some implementation, in order to make full use of an overall bandwidth, each fragment group covers all physical DIE units respectively, in which the DIE unit is a basic unit for receiving and executing a flash command.

S230, purging the cache data in the first target fragment with the most garbage proportion among the first target fragment group.

In the embodiments of the present disclosure, upon the remaining available space being less than the first space threshold, the fragment group that has the greatest garbage proportion, i.e., the first target fragment group, may be determined from the respective fragment groups, and then, the fragment that has the greatest garbage proportion, i.e., the first target fragment, may be further determined from the respective fragments included in the first target fragment group, and then, the cache data in the first target fragment may be erased.

In some implementations, the garbage proportion of each fragment group can be counted, a garbage collection list can be established, and within each fragment group, the garbage proportion of each fragment can be further counted.

In some implementations, the usage of each fragment may be saved in the memory of the electronic device, so that the garbage proportion of each fragment and each fragment group may be further obtained according to the usage of each fragment obtained from the memory.

In addition, in the embodiments of the present disclosure, after the purging is performed once, the remaining available space of the solid-state disk may still be less than the first space threshold, in which case, the above steps S210-S230 may be repeatedly performed until the remaining available space of the solid-state disk is greater than or equal to the first space threshold.

By employing the method of the embodiments of the present disclosure, the remaining available space of the solid-state disk for storing cache data is acquired, the size of the remaining available space is judged with the first space threshold, upon the remaining available space being less than the first space threshold, the first target fragment group with the greatest garbage proportion in the solid-state disk is further determined, and the cache data in the first target fragment with the greatest garbage proportion in the first target fragment group is purged. Considering that upon the remaining available space being less than the first space threshold, more data is in the solid-state disk, and upon the data migration being performed at this time, the system will seriously stuck. In the embodiments of the present disclosure, the degree of system stucking can be reduced by purging all the cache data in the first target fragment instead of migrating a part of valid cache data, and the migration fraction of the cache data in the solid-state disk may be reduced as a whole, the bearing and service capacity of the entire storage system can be improved, and the writing amplification caused by the migration of the part of the cache data is further avoided, so that it is unnecessary to reserve the corresponding migration space for this part of data, and then the saved migration space can be set as a storage space for storing the cache data, so as to improve the space for storing the cache data of the whole solid-state disk and improve the space utilization rate. It has been experimentally verified that it is possible to set above 95% water level, which improves the space utilization rate of the solid-state disk.

In addition, in the embodiments of the present disclosure, even if the cache data in the first target fragment is completely purged, a part of the valid cache data may be discarded, but because the first target fragment with the greatest garbage proportion is discarded, the valid cache data that is discarded is less, which is compatible with the characteristic of discarding data of the cache system itself, and the impact on the business can be ignored.

In some implementations, in order to improve the data access efficiency, after purging the cache data in the first target fragment that has the greatest garbage proportion in the first target fragment group, the method of the embodiments of the present disclosure may further include the following steps:

Deleting all memory indices pointing to the first target fragment.

In the embodiments of the present disclosure, after purging the cache data in the first target fragment in the first target fragment group that has the greatest garbage proportion, all the memory indices pointing to the first target fragment may be deleted, thereby avoiding erroneous access to the storage space.

In combination with the foregoing, it is known that upon the remaining available space being greater than or equal to the first space threshold, the relatively conservative garbage collection policy may be employed, that is, not actively discarding data, but rather employing the garbage collection policy that migrates the valid cache data, therefore, in some implementations, the method of the embodiments of the present disclosure may further include the following steps:

upon the remaining available space being greater than or equal to the first space threshold, determining a second target fragment group in the solid-state disk that has a garbage proportion exceeding a second space threshold; determining a second target fragment of the second target fragment group that has the greatest garbage; migrating valid cache data in the second target fragment to a free fragment for caching; and purging the cache data in the second target fragment.

In the embodiments of the present disclosure, the remaining available space is greater than or equal to the first space threshold, which indicates that the available space is still relatively abundant, and the data migration at this time does not cause the system to severely stuck. Therefore, in this case, the fragment group that has a garbage proportion exceeding the second space threshold (e.g., 80%), that is, the second target fragment group, may be determined from the fragment groups, and then, the fragment that has the greatest garbage proportion, that is, the second target fragment, may be further determined from the fragments included in the second target fragment group, and then, the valid cache data in the second target fragment may be migrated to a free fragment for caching, and the cache data in the second target fragment may be purged after the migration is completed.

In the embodiments of the present disclosure, by dividing the storage structure of the fragment and the fragment group, not only the space advantage of sequential writing of the data can be continued, but also the efficiency of garbage collection can be improved and an amount of the discarded valid cache data can be reduced as much as possible.

In addition, in the embodiments of the present disclosure, after the purging is performed on the cache data in the second target fragment, the garbage proportion of a part of the target fragment groups may still exceed the second space threshold, in which case, the above steps may be repeatedly performed until the garbage proportions of all the fragment groups are less than or equal to the second space threshold.

In some implementations, migrating the valid cache data in the second target fragment to a free fragment for caching may include the following steps:

acquiring hotness respectively corresponding to each valid cache data; and migrating the valid cache data belonging to the same hotness interval to the same free fragment for caching according to the hotness of each valid cache data.

In some implementations, the hotness can be expressed as a hotness value. In this case, each valid cache data may be divided into a corresponding hotness interval according to the respective corresponding hotness value of each valid cache data.

Exemplary, the valid cache data with hotness values of 0-199 is divided into a hotness interval, the valid cache data with hotness values of 200-399 is divided into a hotness interval, the valid cache data with hotness values of 400-599 is divided into a hotness interval, the valid cache data with hotness values of 600-799 is divided into a hotness interval, and so on.

In the embodiments of the present disclosure, access frequencies of the cache data located in the same hotness interval may be similar, by storing the cache data located in the same hotness interval in the same free fragment, the efficiency of managing subsequent cache data can be improved, for example, the cache data with similar hotness can be purged together subsequently upon the purging being needed.

It needs to be noted that, the valid cache data in the embodiments of the present disclosure refers to the valid cache data determined by the business side, which is different from the valid cache data determined by the standard solid-state disk to be migrated upon the standard solid-state disk performing garbage collection itself, by migrating the valid cache data determined by the business side, a business requirement can be met truly, so that the accuracy of the migrated data can be improved, and the waste of resources can be reduced. That is, the method for managing cache data of the embodiments of the present disclosure is distinguished from garbage collection management performed by the solid-state disk itself.

In some implementations, the hotness of the cache data may be determined according to a number of accesses and a number of migrations corresponding to the cache data, therefore, the method of the embodiments of the present disclosure may further include the following steps:

For any of the cache data, determining the hotness corresponding to the cache data based on the number of accesses and the number of migrations corresponding to the cache data.

In an embodiment of the present disclosure, for any of the cache data, the hotness corresponding to the cache data may be determined based on the number of accesses and the number of migrations corresponding to the cache data.

In some implementation, determining the hotness corresponding to the cache data based on an access situation and a migration situation of the cache data, may include the following steps:

in response to the cache data being invoked for access once, controlling a value of a counter corresponding to the cache data to be incremented by one;

in response to the cache data being migrated once, controlling the value of the counter corresponding to the cache data to be decreased by one; and determining the value of the counter as the hotness of the cache data.

In the embodiments of the present disclosure, the counter corresponding to the cache data may be set, and the value of the counter corresponding to the cache data may be controlled to be increased by 1 upon the cache data being invoked for access once, and decreased by 1 upon the cache data being migrated once, so that the hotness of the cache data may be determined by the value of the counter.

In some implementations, a pointer corresponding to any of the cache data is a 64-bit pointer, which includes a 45-bit pointer segment characterizing an address of a logical address space, a 12-bit pointer segment characterizing a data size, a 1-bit pointer segment characterizing a device in which the address is located, and a 6-bit pointer segment characterizing the hotness of the data.

Considering that not all bits in the conventional 64-bit pointer actually participate in the representation of the logical address space, which results in the waste of bits in the pointer, in the embodiment of this disclosure, the pointer used in the cache system is further improved.

Considering that the maximum single-disk solid-state disk or stand-alone memory capacity usually supported by the cache system is 32 TB, in the embodiments of the present disclosure, the address of the logical address space may be represented by the 45 bits of the 64-bit pointer.

In addition, considering that the efficiency of reading data may be higher upon an approximate size of the target data being known, therefore, in the embodiments of the present disclosure, a data size may be represented by 12 bits in the 64-bit pointer. For example, 12 bits are used to record how many 4 KB the data length is presumably.

In addition, considering that conventionally the pointer in the memory usually points to a specific location in the solid-state disk (that is, the address of the logical address space in the solid-state disk), but sometimes the data is still in the memory, in which case it is desirable for the index to be able to obtain the data directly in the memory, without having to obtain the data from the solid-state disk, because it is slower to obtain the data from the solid-state disk, in the embodiments of the present disclosure, one bit of the 64-bit pointer may be used to represent the device where the address corresponding to the data is located. For example, a 0 is used to represent the memory and a 1 is used to represent the solid-state disk.

By using 1 bit in the 64-bit pointer to represent the device where the address corresponding to the data is located, both the memory and solid-state disk indexing are supported by one data structure, which simplifies a code complexity.

In addition, in conjunction with the foregoing, it can be known that the cache data has a corresponding hotness, therefore, in the embodiments of the present disclosure, 6 bits of the 64-bit pointer may be used to represent the hotness of the cache data.

Figure 4:
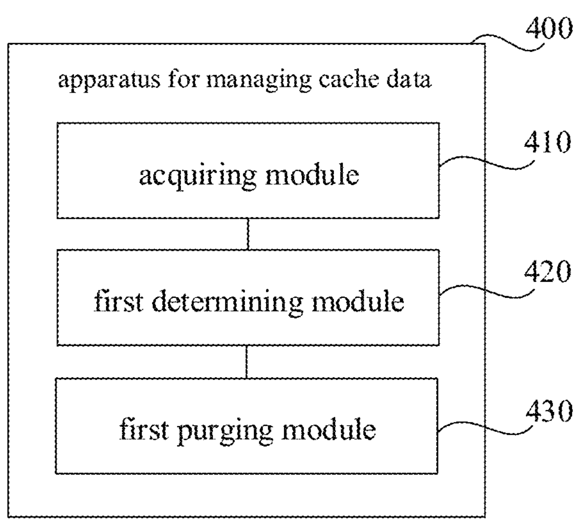
FIG. 4 is a block diagram of an apparatus for managing cache data according to an exemplary embodiment of the present disclosure.

FIG. 4 is a block diagram of an apparatus for managing cache data according to an exemplary embodiment of the present disclosure. Referring to FIG. 4, the apparatus for managing cache data 400 includes:

an acquiring module 410, configured to acquire a remaining available space of a solid-state disk for storing cache data;

a first determining module 420, configured to, upon the remaining available space being less than a first space threshold, determine a first target fragment group in the solid-state disk that has the greatest garbage proportion, in which each fragment group includes a first number of fragments, each fragment corresponds to a second number of contiguous logical address spaces in the solid-state disk; and a first purging module 430, configured to purge the cache data in the first target fragment of the first target fragment group that has the greatest garbage proportion.

Optionally, the apparatus for managing cache data 400 further includes:

a second determining module, configured to, upon the remaining available space being greater than or equal to the first space threshold, determine a second target fragment group in the solid-state disk that has a garbage proportion exceeding a second space threshold;

a third determining module, configured to determine a second target fragment of the second target fragment group that has the greatest garbage proportion;

a migration module, configured to migrate valid cache data in the second target fragment to a free fragment for caching; and a second purging module, configured to purge the cache data in the second target fragment.

Optionally, the migration module includes:

an acquiring sub-module, configured to acquire hotness respectively corresponding to each valid cache data; and a migration submodule, configured to, migrate the valid cache data belonging to the same hotness interval to the same free fragment for caching according to the hotness of each valid cache data.

Optionally, the apparatus for managing cache data 400 further includes:

a fourth determining module, configured to determine, for any of the cache data, determine the hotness corresponding to the cache data based on a number of accesses and a number of migrations corresponding to the cache data.

Optionally, the fourth determining module includes:

a first control sub-module, configured to, in response to the cache data being invoked for access once, control a value of a counter corresponding to the cache data to be incremented by one;

a second control sub-module, configured to, in response to the cache data being migrated once, control the value of the counter corresponding to the cache data to be decremented by one; and a determining sub-module, configured to determine the value of the counter as the hotness of the cache data.

Optionally, a pointer corresponding to any of the cache data is a 64-bit pointer, which includes a 45-bit pointer segment characterizing an address of a logical address space, a 12-bit pointer segment characterizing a data size, a 1-bit pointer segment characterizing a device where the address is located, and a 6-bit pointer segment characterizing hotness of the data.

Optionally, the apparatus for managing cache data 400 further includes:

a deleting module, configured to delete all memory indices pointing to the first target fragment.

Figure 5:
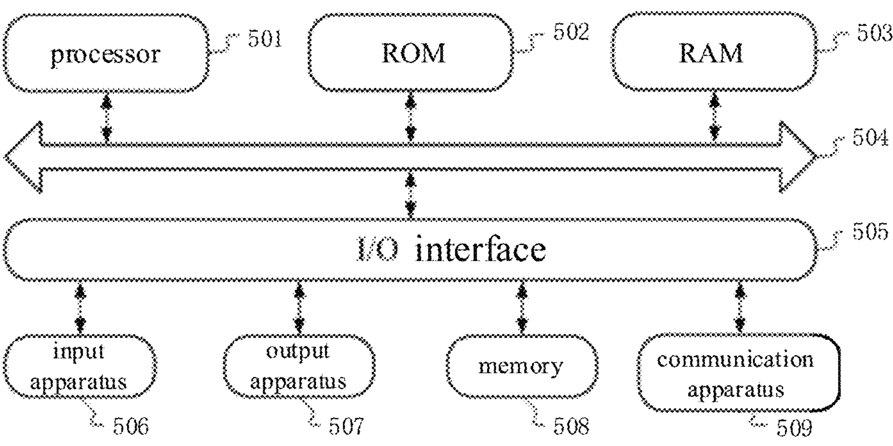
FIG. 5 is a structural schematic diagram of an electronic device according to an exemplary embodiment of the present disclosure.

Reference is now made to FIG. 5, which illustrates a schematic structural diagram of an electronic device 500 suitable for implementing the embodiments of the present disclosure. The electronic device in the embodiments of the present disclosure may include, but is not limited to, a device such as a computer and a notebook and other devices that use a solid-state disk as a storage medium for caching data. The electronic device illustrated in FIG. 5 is merely one example and should not bring any limitation to the function and application scope of the embodiments of the present disclosure.

As illustrated in FIG. 5, the electronic device 500 may include a processor (for example, a central processor, a graphics processor, and so on) 501 that may execute various appropriate actions and processes according to a program stored in a read-only memory (ROM) 502 or a program loaded from a random-access memory (RAM) 503 from a memory 508. In the RAM 503, various programs and data required for the operation of the electronic device 500 are further stored. The processor 501, the ROM 502 and the RAM 503 are interconnected by a bus 504. An input/output (I/O) interface 505 is also connected to the bus 504.

Generally, the following devices may be connected to the I/O interface 505: an input apparatus 506 including, for example, a touch screen, a touch pad, a keyboard, a mouse, a camera, a microphone, an accelerometer, a gyroscope, etc.; an output apparatus 507 including, for example, a liquid crystal display (LCD), a loudspeaker, a vibrator, etc.; a memory 508 including, for example, a magnetic tape, a hard disk, etc.; and a communication apparatus 509. The communication apparatus 509 may allow the electronic device 500 to perform wireless or wired communication with other devices to exchange data. While the electronic device 500 with various devices is illustrated in FIG. 5, it should be understood that it is not required to implement or have all the apparatuses illustrated. It may implement alternatively or possess the more or less apparatuses.

In particular, according to the embodiments of the present disclosure, the processes described above with reference to the flowcharts may be implemented as a computer software program. For example, an embodiment of the present disclosure includes a computer program product, which includes a computer program carried by a non-transitory computer-readable medium, the computer program includes program codes for performing the method illustrated in the flowchart. In such an embodiment, the computer program may be downloaded and installed from a network through the communication apparatus 509, or installed from the memory 508, or installed from the ROM 502. Upon the computer program being executed by the processor 501, the above-mentioned functions defined in the method of the embodiment of the present disclosure are performed.

It should be noted that the computer-readable medium mentioned above in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, device or device, or any combination thereof. More specific examples of the computer-readable storage medium may include, but not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, a solid-state disk or any suitable combination of the above. In the present disclosure, the computer-readable storage medium may be any tangible medium containing or storing a program that may be used by or in combination with an instruction execution system, device or device. In the present disclosure, the computer-readable signal medium may include a data signal propagated in a baseband or as a part of a carrier wave, in which computer-readable program codes are carried. This propagated data signal may take multiple forms, including but not limited to an electromagnetic signal, an optical signal or any suitable combination of the above. The computer-readable signal medium may also be any computer-readable medium other than the computer-readable storage medium, and may send, propagate or transmit a program used by or in combination with an instruction execution system, an apparatus or a device. The program codes contained on the computer-readable medium may be transmitted by any suitable medium, including but not limited to: an electric wire, a fiber-optic cable, radio frequency (RF) and so on, or any suitable combination of the above.

In some implementations, the electronic device may communicate by using any currently known or future developed network protocol such as a hypertext transfer protocol (HTTP), and may communicate and interconnect with digital data communication in any form or medium (for example, a communication network). Examples of the communication network include a local area network (Local Area Network, "LAN"), a wide area network (Wide Area Network, "WAN"), the Internet work (for example, the Internet) and an end-to-end network (for example, an ad hoc end-to-end network), as well as any currently known or to be researched and developed in the future.

The computer-readable medium described above may be included in the above-mentioned electronic device; or it may exist alone without being assembled into the electronic device.

The computer-readable medium carries one or more programs that, upon being executed by the electronic device, cause the electronic device to: acquire a remaining available space of a solid-state disk for storing cache data; upon the remaining available space being less than a first space threshold, determine a first target fragment group in the solid-state disk that has the greatest garbage proportion, in which each fragment group includes a first number of fragments, and each fragment corresponds to a second number of contiguous logical address spaces in the solid-state disk; and purge the cache data in the first target fragment of the first target fragment group that has the greatest garbage proportion.

Computer program codes for performing the operations of the present disclosure may be written in one or more programming languages or a combination thereof, the programming languages include, but are not limited to, object-oriented programming languages such as Java, Smalltalk and C++, and further include conventional procedural programming languages such as "C" programming language or similar programming languages. The program codes may be entirely executed on a user's computer, partially executed on the user's computer, executed as an independent software package, partially executed on the user's computer and partially executed on a remote computer, or entirely executed on the remote computer or a server. In the case involving a remote computer, the remote computer may be connected to the user's computer through any type of network, including a local area network (LAN) or a wide area network (WAN), or may be connected to an external computer (for example, through the Internet using an Internet service provider).

The flowcharts and block diagrams in the accompanying drawings illustrate the architecture, function and operation of possible implementations of the systems, methods and the computer program product according to various embodiments of the present disclosure. In this regard, each block in the flowcharts or block diagrams may represent a module, a program segment, or a part of codes, which includes one or more executable instructions for implementing specified logical functions. It should also be noted that, in some alternative implementations, the functions noted in the blocks may occur out of the order noted in the accompanying drawings. For example, two blocks illustrated in succession may, in fact, be executed substantially in parallel, and may sometimes be executed in a reverse order, depending on the function involved. It should also be noted that, each block in the block diagrams and/or flowcharts, and combinations of blocks in the block diagrams and/or flow diagrams, may be implemented by a dedicated hardware-based system that performs specified functions or operations, or by a combination of dedicated hardware and computer instructions.

The modules involved in the embodiments described in the present disclosure may be implemented by software or hardware. Among them, the name of the module does not constitute a limitation on the module itself in some cases.

The functions described above herein may be at least partially performed by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logic device (CPLD) and so on.

In the context of the present disclosure, the machine-readable medium may be a tangible medium that may include or store a program used by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The description is merely the preferred embodiments of the present disclosure and illustrative of the principles of the technology employed. It should be understood by those skilled in the art that the disclosure scope involved in the present disclosure is not limited to the technical solutions formed by the specific combination of the above technical features, but also covers other technical solutions formed by any combination of the above technical features or their equivalent features without departing from the concept of the above disclosure, for example, technical solution that formed by replacing the above features with the technical features with similar functions disclosed in this disclosure (but not limited to).

Furthermore, although various operations are depicted in a particular order, this should not be understood as requiring that these operations be performed in the particular order illustrated or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A method for managing cache data, comprising:

acquiring a remaining available space of a solid-state disk for storing cache data;

upon the remaining available space being less than a first space threshold, determining a first fragment group in the solid-state disk that has the greatest garbage proportion, wherein each fragment group comprises a first number of fragments, and each fragment corresponds to a second number of contiguous logical address spaces in the solid-state disk; and purging the cache data in the first fragment of the first fragment group that has the greatest garbage proportion.

2. The method according to claim 1, further comprising:

upon the remaining available space being greater than or equal to the first space threshold, determining a second fragment group in the solid-state disk that has a garbage proportion exceeding a second space threshold;

determining a second fragment of the second fragment group that has the greatest garbage proportion;

migrating valid cache data in the second fragment to a free fragment for caching; and purging the cache data in the second fragment.

3. The method according to claim 2, wherein migrating the valid cache data in the second fragment to the free fragment for caching, comprises:

acquiring hotness respectively corresponding to each valid cache data; and migrating the valid cache data belonging to the same hotness interval to the same free fragment for caching according to the hotness of each valid cache data.

4. The method according to claim 1, further comprising:

for any of the cache data, determining the hotness corresponding to the cache data based on a number of accesses and a number of migrations corresponding to the cache data.

5. The method according to claim 4, wherein determining the hotness corresponding to the cache data based on the access situation and the migration situation of the cache data, comprises:

in response to the cache data being invoked for access once, controlling a value of a counter corresponding to the cache data to be incremented by one;

in response to the cache data being migrated once, controlling the value of the counter corresponding to the cache data to be decreased by one; and determining the value of the counter as the hotness of the cache data.

6. The method according to claim 1, wherein a pointer corresponding to any of the cache data is a 64-bit pointer, which comprises a 45-bit pointer segment characterizing an address of the logical address space, a 12-bit pointer segment characterizing a data size, a 1-bit pointer segment characterizing a device where the address is located, and a 6-bit pointer segment characterizing hotness of the data.

7. The method according to claim 1, wherein after the purging the cache data in the first fragment of the first fragment group that has the greatest garbage proportion, the method further comprises:

deleting all memory indices pointing to the first fragment.

8. A non-transitory computer-readable medium, wherein a computer program is stored on the non-transitory computer-readable storage medium, and the computer program, upon being executed by a processing device, implements:

acquiring a remaining available space of a solid-state disk for storing cache data;

upon the remaining available space being less than a first space threshold, determining a first fragment group in the solid-state disk that has the greatest garbage proportion, wherein each fragment group comprises a first number of fragments, and each fragment corresponds to a second number of contiguous logical address spaces in the solid-state disk; and purging the cache data in the first fragment of the first fragment group that has the greatest garbage proportion.

9. The non-transitory computer-readable medium according to claim 8, wherein the computer program further implements:

upon the remaining available space being greater than or equal to the first space threshold, determining a second fragment group in the solid-state disk that has a garbage proportion exceeding a second space threshold;

determining a second fragment of the second fragment group that has the greatest garbage proportion;

migrating valid cache data in the second fragment to a free fragment for caching; and purging the cache data in the second fragment.

10. The non-transitory computer-readable medium according to claim 9, wherein the computer program further implements:

acquiring hotness respectively corresponding to each valid cache data; and migrating the valid cache data belonging to the same hotness interval to the same free fragment for caching according to the hotness of each valid cache data.

11. The non-transitory computer-readable medium according to claim 8, wherein the computer program further implements:

for any of the cache data, determining the hotness corresponding to the cache data based on a number of accesses and a number of migrations corresponding to the cache data.

12. The non-transitory computer-readable medium according to claim 11, wherein the computer program further implements:

in response to the cache data being invoked for access once, controlling a value of a counter corresponding to the cache data to be incremented by one;

in response to the cache data being migrated once, controlling the value of the counter corresponding to the cache data to be decreased by one; and determining the value of the counter as the hotness of the cache data.

13. The non-transitory computer-readable medium according to claim 8, wherein the computer program further implements:

deleting all memory indices pointing to the first fragment.

14. An electronic device, comprising:

a memory, storing a computer program; and a processor, configured to execute the computer program in the memory to implement:

acquiring a remaining available space of a solid-state disk for storing cache data;

upon the remaining available space being less than a first space threshold, determining a first fragment group in the solid-state disk that has the greatest garbage proportion, wherein each fragment group comprises a first number of fragments, and each fragment corresponds to a second number of contiguous logical address spaces in the solid-state disk; and purging the cache data in the first fragment of the first fragment group that has the greatest garbage proportion.

15. The electronic device according to claim 14, wherein the processor is configured to execute the computer program in the memory to further implement:

upon the remaining available space being greater than or equal to the first space threshold, determining a second fragment group in the solid-state disk that has a garbage proportion exceeding a second space threshold;

determining a second fragment of the second fragment group that has the greatest garbage proportion;

migrating valid cache data in the second fragment to a free fragment for caching; and purging the cache data in the second fragment.

16. The electronic device according to claim 15, wherein the processor is configured to execute the computer program in the memory to further implement:

acquiring hotness respectively corresponding to each valid cache data; and migrating the valid cache data belonging to the same hotness interval to the same free fragment for caching according to the hotness of each valid cache data.

17. The electronic device according to claim 14, wherein the processor is configured to execute the computer program in the memory to further implement:

for any of the cache data, determining the hotness corresponding to the cache data based on a number of accesses and a number of migrations corresponding to the cache data.

18. The electronic device according to claim 17, wherein the processor is configured to execute the computer program in the memory to further implement:

in response to the cache data being invoked for access once, controlling a value of a counter corresponding to the cache data to be incremented by one;

in response to the cache data being migrated once, controlling the value of the counter corresponding to the cache data to be decreased by one; and determining the value of the counter as the hotness of the cache data.

19. The electronic device according to claim 14, wherein a pointer corresponding to any of the cache data is a 64-bit pointer, which comprises a 45-bit pointer segment characterizing an address of the logical address space, a 12-bit pointer segment characterizing a data size, a 1-bit pointer segment characterizing a device where the address is located, and a 6-bit pointer segment characterizing hotness of the data.

20. The electronic device according to claim 14, wherein the processor is configured to execute the computer program in the memory to further implement:

deleting all memory indices pointing to the first fragment.

* * * * *